Figure 1:
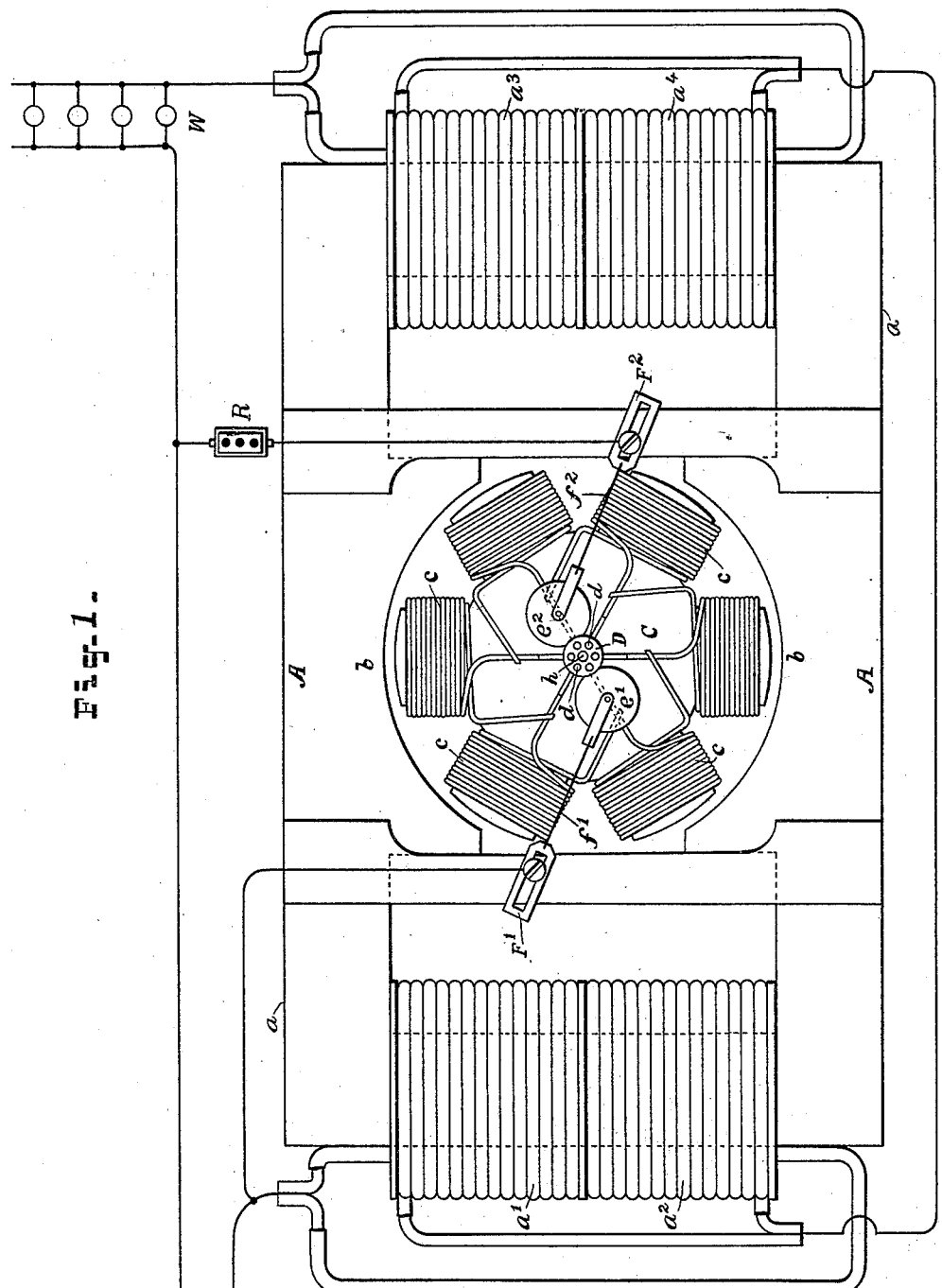

(No Model.) 2 Sheets—Sheet 1.

G. WESTINGHOUSE, Jr.
ALTERNATING CURRENT ELECTRIC METER.

No. 427,489. Patented May 6, 1890.

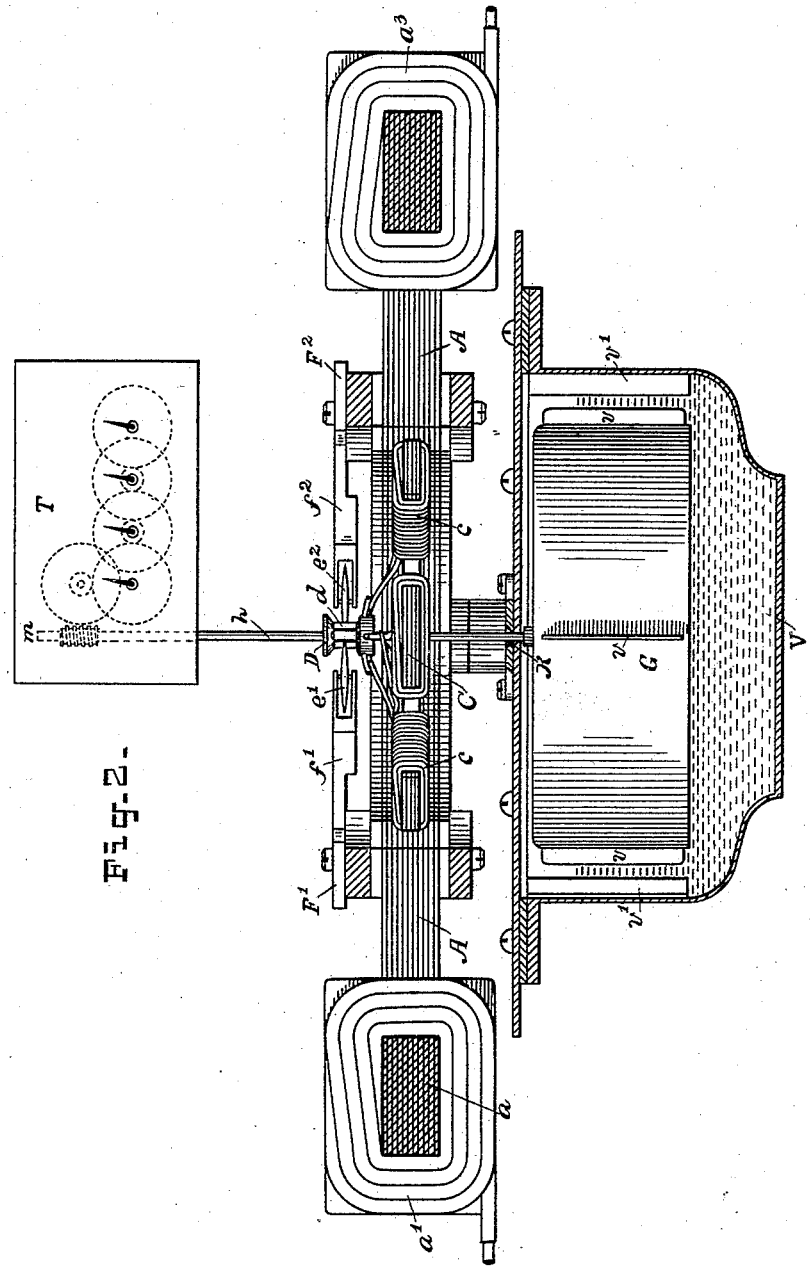

UNITED STATES PATENT OFFICE.

GEORGE WESTINGHOUSE, JR., OF PITTSBURG, PENNSYLVANIA.

ALTERNATING-CURRENT ELECTRIC METER.

SPECIFICATION forming part of Letters Patent No. 427,489, dated May 6, 1890.

Application filed March 4, 1890. Serial No. 342,639. (No model.)

*To all whom it may concern:*

Be it known that I, GEORGE WESTINGHOUSE, Jr., a citizen of the United States, and a resident of Pittsburg, in the county of Allegheny and State of Pennsylvania, have invented a certain new and useful Improvement in Alternating-Current Electric Meters, of which the following is a specification.

The invention relates especially to the class of apparatus employed for measuring alternating, intermittent, or pulsatory electric currents; and the object of the invention is to provide a meter which shall be reliable in its operation, simple in its construction, and which may be manufactured at small expense.

The invention is also applicable to the measurement of continuous currents.

The general construction of the meter is as follows: There is connected in the circuit conveying the current to be measured the coils constituting the field-magnet coils of an electric motor. In shunt upon these coils and upon the work-circuit there are connected the coils of an armature designed to revolve within the field of force established by the field-coils. These armature-coils are connected in shunt upon the work-circuit, and connections are made therewith through a commutating device in the manner of an ordinary electric motor. The revolution of the armature is recorded by means of any suitable time-train mechanism or counting device. The rate of revolution is controlled by means of some suitable retarding device—such, for instance, as fans or vanes moving in a suitable liquid.

The invention will be described more in detail in connection with the accompanying drawings, of which Figure 1 is a plan view of the meter, and Fig. 2 is a longitudinal section of the same.

Referring to the figures, A represents the field-magnet of the motor portion of the meter, and this consists, in the present instance, of a core $a$, of soft iron, preferably laminated, and constructed with consequent poles $b$. The coils $a'$ $a^2$ $a^3$ $a^4$ are shown as wound about the core at its respective ends in four divisions, which may be connected in the work-circuit conductor either in series or in multiple or in multiple series to suit the requirements of the different circuits. The armature C (shown in the present instance) consists of a polar magnet having a core composed of laminæ of soft iron and wound with the coils $c$ of insulated wire, the terminals of which are connected with the contact-plates $d$ of the commutator D. Electrical connection is made with the plates of this commutator by means of suitable brushes or contacts—such, for instance, as indicated at $e'$ $e^2$ in the drawings. These consist of two brushes or wheels of copper or other good conducting material carried upon the spring-arms $f'$ $f^2$, and electrical connection is made with the supports $F'$ $F^2$ of these arms for connecting the armature in shunt upon the work-circuit W. The armature is mounted upon the shaft $h$, having suitable bearing at $k$ and passing through an aperture in the arm or support $m$. The armature-shaft is stepped in a float G, which is carried in a basin V for containing a fluid. The float turns with the shaft. The revolutions of this armature are registered by means of a counting-train T, driven by the revolution of the shaft in any suitable manner.

For the purpose of retarding the motion of the armature and rendering its rate of revolution proportional to the work being done at different velocities, fans or vanes $v$ are carried by the float G, and these revolve in the fluid which is contained in the basin V. Other vanes or walls $v'$ may project from the basin inward to prevent the fluid from acquiring a rotary motion also.

It is evident that upon a constant potential circuit the armature will receive a constant polarization, while the field of force will vary as the current. Therefore the retarding influence should vary directly as the speed. The result is sufficiently approximated for practical purposes by the use of the vanes and float.

R represents an artificial resistance, which may be used in the armature-circuit, and which may be made adjustable.

I claim as my invention—

1. A meter for alternating electric currents, consisting of a motor having field-magnet coils connected in series with the work-circuit, armature-coils connected across the work-circuit, a counting, registering, or indicating device operated by the movements of the armature, and a retarding device applied to the armature.

2. In an alternating-current electric meter, an actuating device consisting of the combination of field-magnet coils connected in series with the work-circuit, and armature-coils successively connected across the work-circuit, and a retarding device varying in effect directly as the velocity, substantially as described.

In testimony whereof I have hereunto subscribed my name this 28th day of February, A. D. 1890.

GEO. WESTINGHOUSE, JR.

Witnesses:
    G. W. HEBARD,
    LEONARD E. CURTIS.